United States Patent
Collings

(10) Patent No.: US 11,551,649 B2
(45) Date of Patent: Jan. 10, 2023

(54) MUSIC LEARNING AID

(71) Applicant: Timothy Andrew Collings, Red Hill (AU)

(72) Inventor: Timothy Andrew Collings, Red Hill (AU)

( * ) Notice: Subject to any disclaimer, the term of this patent is extended or adjusted under 35 U.S.C. 154(b) by 0 days.

(21) Appl. No.: 17/495,406

(22) Filed: Oct. 6, 2021

(65) Prior Publication Data

US 2022/0108672 A1    Apr. 7, 2022

(30) Foreign Application Priority Data

Oct. 7, 2020 (AU) ............................... 2020903623

(51) Int. Cl.
  *G10G 1/02* (2006.01)
  *G09B 15/02* (2006.01)
  *G09B 15/00* (2006.01)

(52) U.S. Cl.
  CPC ............. *G10G 1/02* (2013.01); *G09B 15/002* (2013.01); *G09B 15/007* (2013.01); *G09B 15/023* (2013.01); *G09B 15/026* (2013.01)

(58) Field of Classification Search
  CPC ...... G10G 1/02; G09B 15/002; G09B 15/007; G09B 15/023; G09B 15/026
  See application file for complete search history.

(56) References Cited

U.S. PATENT DOCUMENTS

| | | | | | |
|---|---|---|---|---|---|
| 1,467,032 | A | * | 9/1923 | Sargant | G09B 15/007 84/474 |
| 3,427,918 | A | * | 2/1969 | Amoruso | G09B 15/023 84/474 |
| 4,037,518 | A | * | 7/1977 | Garcia Lorenzen | G09B 15/007 84/474 |
| 4,069,735 | A | * | 1/1978 | Bertram | G09B 15/005 84/474 |
| 4,887,507 | A | * | 12/1989 | Shaw | G09B 15/026 84/474 |

(Continued)

FOREIGN PATENT DOCUMENTS

| | | | | | |
|---|---|---|---|---|---|
| CA | 2353846 | C | * | 6/2005 | ............. G09B 15/00 |
| GB | 2592847 | A | * | 9/2021 | ........... G09B 15/026 |

*Primary Examiner* — Robert W Horn
(74) *Attorney, Agent, or Firm* — Andrus Intellectual Property Law, LLP

(57) ABSTRACT

A music learning aid, comprising: a first rotatable circular substrate having a radius (R1) comprising an in-use first visible circular scale displayed on the first substrate, the visible display comprising a plurality of indicia for indicating corresponding musical notes such that the musical notes indicated in the visible display scale ascend in frequency in a clock-wise or anti-clockwise direction; a second circular substrate having a radius (R3), the second substrate being arranged to be substantially concentric and rotatable relative to the first substrate by the fastening arrangement to enable the second substrate to rotate relative to the first substrates, the second substrate comprising a polygon with vertices of the polygon being located along the circumference of the second substrate, the second substrate comprising respective indicia corresponding to each of the vertices for indicating a respective musical mode selected from a set of a plurality of musical modes.

22 Claims, 13 Drawing Sheets

(56) References Cited

U.S. PATENT DOCUMENTS

| | | | | |
|---|---|---|---|---|
| 5,320,020 A | * | 6/1994 | Corley | G10G 1/02 84/474 |
| 5,709,552 A | * | 1/1998 | LeGrange | G09B 15/026 84/474 |
| 7,820,900 B2 | * | 10/2010 | Lemons | G09B 15/023 345/23 |
| 7,880,076 B2 | * | 2/2011 | Lemons | G09B 15/00 84/600 |
| 7,935,877 B2 | * | 5/2011 | Lemons | G10H 1/0025 345/23 |
| 9,076,346 B2 | * | 7/2015 | Quattrocchi | G09B 15/002 |
| 2022/0108672 A1 | * | 4/2022 | Collings | G09B 15/002 |

* cited by examiner

MUSIC LEARNING AID

TECHNICAL FIELD

The present invention relates to a musical learning aid device and system for visualising the musical learning aid. More specifically, the present invention is able to help users understand the process and formulas used to compose a musical piece regardless of instrument.

BACKGROUND

Any references to methods, apparatus or documents of the prior art are not to be taken as constituting any evidence or admission that they formed, or form part of the common general knowledge.

When either studying or communicating musical theory, the user is met with an extensive and well established language describing the various concepts that constitute music theory. This can often be overwhelming to the user and cumbersome to explore.

These concepts reflect a number of sets and subsets of musical notes of ascending or descending tone, some of which are derived from observed mathematical consistencies and others subjectively agreed upon from generations of investigation and experimentation.

The first of these sets is known as octaves identifiable by a mathematical consistency that relates the frequency of a note to the length of the vibrating string/wind column of the instrument being explored. When the length is exactly halved or doubled the frequency of the corresponding note created is either exactly doubled or halved respectively. This produces a note that is harmonically indistinguishable from its original counterpart. These notes all belong to the same pitch class and are designated the same identifying character. This identifies a pattern that repeats itself whenever a string/wind column is halved or doubled in length. The interval between these notes is called an octave.

This octave interval can then be further divided into a set of any number of individual notes. Traditionally this was done using just intonation by examining the ratios of whole numbers that fall within an octave this gives a result of varying intervals between notes. More recently a system of equal temperament is used to divide an octave into any number or equal intervals between notes. This set of all notes between octaves arranged sequentially in ascending/descending frequency is called a chromatic scale, which also repeats its pattern every octave. For the remainder of this document we will use the most common Chromatic scale of Western Music Theory, that of 12 equal temperament intervals identified by the first 7 letters of the English alphabet A-G with 5 flats/sharps identified by a b/♯ in conjunction with one of the aforementioned letters.

This chromatic scale set of notes can be further divided into a multitude of different subsets know as a keys/scales containing an combination of 2 or more notes of the chromatic scale set. Grouping notes that are more harmonious with one another or combine together to create a unique feel/mood. This subset of notes can be explored using any single notes contained within the subset as the root position/key signature creating different modes of the subset, with each mode usually differing intervals between sequential notes. This subset of notes is called a key. When subset of notes is played sequentially in ascending or descending tones it is called a scale. A key/scale is always described combining the tonic note and mode.

These subsets of keys/scales can be further divided into subsets know as chords containing a combination of any 2 or more notes contained in the Key being explored. Each note within a key subset will have a corresponding relative chord structure dependent on the intervals between the tonic of the chord and the intervals to the notes that proceed it in the scale.

In view of the above, it is desirable to provide a music learning aid which aids the user in exploring these various concepts of sets and subsets by means of a permutable visual aid that lets the user identify these various sets, how they relate to each other, how they combine to create music and the language most commonly used to describe and communicate them.

SUMMARY OF INVENTION

In an aspect, the invention provides a music learning aid, comprising:
a first rotatable circular substrate having a radius (R1) comprising an in-use first visible circular scale displayed on the first substrate, the visible display comprising a plurality of indicia for indicating corresponding musical notes such that the musical notes indicated in the visible display scale ascend in frequency in a clock-wise or anti-clockwise direction;
a second circular substrate having a radius (R3), the second substrate being arranged to be substantially concentric and rotatable relative to the first substrate by the fastening arrangement to enable the second substrate to rotate relative to the first substrate, the second substrate comprising a polygon with vertices of the polygon being located along the circumference of the second substrate, the second substrate comprising respective indicia corresponding to each of the vertices for indicating a corresponding musical mode selected from a set of musical modes including but not limited to the following modes: Ionian, Dorian, Phyrigian, Lydian, Mixolydian, Aeolian and Locrian.

In an embodiment, when one of the vertices of the polygon of the second substrate is pointed towards a key musical note indicated on the visible display scale of the first substrate, the other of remaining vertices of the polygon on the second substrate identify on the chromatic wheel the position of the notes constituting the key musical note on which the one of said vertices is pointed.

In an embodiment, the music learning aid further comprises a third circular substrate having a radius (R2), the third substrate being arranged to be substantially concentric and non-rotatable relative to the first substrate by a fastening arrangement to enable the first substrate to rotate relative to the third substrate, a third in-use visible circular scale displayed on the third substrate, the third visible display comprising indicia for indicating corresponding musical scale degrees or intervals or Solfège such that the musical scale degrees or intervals or Solfège indicated in the third visible scale ascend in frequency in a clock-wise or anti-clockwise direction.

In an embodiment, the music learning aid in accordance with claim 1 or claim 2 further comprising: a fourth substrate being arranged to be substantially concentric and rotatable relative to the first, second and third substrate by the fastening arrangement to enable the fourth substrate to rotate relative to the first, second and third substrates, the fourth substrate comprising a plurality of chord degree indicators provided on a circular scale such that the chord degrees indicated by each indicator ascend in a clockwise or anti-clockwise direction.

In an embodiment, the music learning aid further comprises a plurality of radially outwardly extending pointers such that each pointer corresponds to a chord degree indicated by a respective chord degree indicator.

In an embodiment, each pointer comprises a length (l) which is sufficiently long to extend across a circumferentially outer portion of top surface portion of the third substrate.

In an embodiment, the music learning aid further comprises: a fifth substrate comprising one or more triangles wherein vertices of the one or more said triangles lie on the same imaginary circle with the centre of the imaginary circle lying within the area bound by the one or more triangles, the centre of the fifth substrate being fastened to the first, second, third and fourth substrates by the fastening arrangement to allow rotation of the fifth substrate relative to the first, second, third and fourth substrates and wherein each triangle denotes a chord shape.

In an embodiment, the fifth substrate comprises a plurality of triangle wherein the plurality of triangles comprise an overlapping vertex In a preferred embodiment, the first visible circular scale is displayed on a circumferential portion of the first substrate.

In a preferred embodiment, the second visible circular scale is displayed on a circumferential portion of the second substrate.

In another aspect, the invention provides a system for visualising a music learning aid, the system comprising: a processor in communication with a display screen, the processor being arranged to execute machine readable instructions to display:

a first rotatable circular structure having a radius (R1) with a first centre point, the first structure comprising an in-use first visible circular scale displayed on the first structure, the visible display comprising a plurality of indicia for indicating corresponding musical notes such that the musical notes indicated in the visible display scale ascend in frequency in a clock-wise or anti-clockwise direction;

a second circular structure having a radius (R3), the second structure being arranged to be substantially concentric relative to the first substrate, the second substrate comprising a polygon with vertices of the polygon being located along the circumference of the second substrate, the second substrate comprising respective indicia corresponding to each of the vertices for indicating a corresponding musical mode from the set of musical modes including but not limited to the following modes: Ionian, Dorian, Phyrigian, Lydian, Mixolydian, Aeolian and Locrian; and wherein the each of the first and second structures as displayed on the display device comprises input interface adapted to receive user input to effect rotation of the second structure and the first structure about the centre point.

In an embodiment, the polygon displayed on the second substrate is structured such that when one of the vertices of the polygon of the second substrate is pointed towards a key musical note indicated on the visible display scale of the first substrate, the other of remaining vertices of the polygon on the second substrate identify on the chromatic wheel the position of the notes constituting the key musical note on which the one of said vertices is pointed.

In an embodiment, the processor is arranged to execute machine readable instructions to further display: a third circular structure having a radius (R2), the third structure being arranged to be substantially concentric relative to the first and second structures, the third structure comprising an in-use visible circular scale displayed on the third substrate, the third visible display comprising indicia for indicating corresponding musical scale degrees or intervals or Solfège such that the musical scale degrees or intervals or Solfège indicated in the third visible scale ascend in frequency in a clock-wise or anti-clockwise direction.

In an embodiment, the processor is arranged to execute machine readable instructions to further display a fourth structure being arranged to be substantially concentric and rotatable relative to the first and second structures, the fourth structure comprising a plurality of chord degree indicators provided on a circular scale such that the chord degrees indicated by each indicator ascend in a clockwise or anti-clockwise direction and wherein the fourth structure as displayed on the display device comprises an input interface adapted to receive user input to effect rotation of the fourth structure about the centre point.

In an embodiment, the processor is arranged to execute machine readable instructions to further display a fifth structure comprising one or more triangles wherein vertices of said the one or more triangles lie on the same imaginary circle with the centre of the imaginary circle lying within the area bound by the plurality of triangles, each triangle denoting a chord shape and wherein the fifth structure as displayed on the display device comprises an input interface adapted to receive user input to effect rotation of the fifth structure about the centre point.

In an embodiment, the fifth structure comprises a plurality of triangles with an overlapping vertex In yet another aspect, the invention provides a method for visualising a music learning aid, the method comprising the steps of:

arranging a processor in communication with a display screen; and providing machine readable instructions to the processor to display, on the display screen:

a first rotatable circular structure having a radius (R1) with a first centre point, the first structure comprising an in-use first visible circular scale displayed on the first structure, the visible display comprising a plurality of indicia for indicating corresponding musical notes such that the musical notes indicated in the visible display scale ascend in frequency in a clock-wise or anti-clockwise direction; a second circular structure having a radius (R3), the second structure being arranged to be substantially concentric relative to the first substrate, the second substrate comprising a polygon with vertices of the polygon being located along the circumference of the second substrate, the second substrate comprising respective indicia corresponding to each of the vertices for indicating a musical mode from the following set of modes including Ionian, Dorian, Phyrigian, Lydian, Mixolydian, Aeolian and Locrian; and providing an input interface coupled with the first and second structures as displayed on the display device to receive user input to effect rotation of the second structure and the first structure about the centre point.

In an embodiment, the method comprises that step of structuring the vertices of the polygon such that whilst being displayed when one of the vertices of the polygon of the second substrate is pointed towards a key musical note indicated on the visible display scale of the first substrate, the other of remaining vertices of the polygon on the second substrate identify on the chromatic wheel the position of the notes constituting the key musical note on which the one of said vertices is pointed.

In an embodiment, the method further comprises the step of providing machine readable instructions to the processor to display, on the display screen:

a third circular structure having a radius (R2), the third structure being arranged to be substantially concentric relative to the first and second structures, the third structure comprising an in-use visible circular scale displayed on the third substrate, the third visible display comprising indicia for indicating corresponding musical scale degrees such that the musical scale degrees indicated in the third visible scale ascend in frequency in a clock-wise or anti-clockwise direction.

In an embodiment, the method further comprises the step of providing machine readable instructions to the processor to display, on the display screen, a fourth structure being arranged to be substantially concentric and rotatable relative to the first and second structures, the fourth structure comprising a plurality of chord degree indicators provided on a circular scale such that the chord degrees indicated by each indicator ascend in a clockwise or anticlockwise direction; and providing an input interface coupled with the fourth structure as displayed on the display device comprises to receive user input to effect rotation of the fourth structure about the centre point.

In an embodiment, the method further comprises the step of providing machine readable instructions to the processor to display, on the display screen: a fifth structure comprising one or more triangles wherein vertices of the one or more said triangles lie on the same imaginary circle with the centre of the imaginary circle lying within the area bound by the plurality of triangles, each triangle denoting a chord shape and wherein the fifth structure as displayed on the display device comprises an input interface adapted to receive user input to effect rotation of the fifth structure about the centre point.

In an embodiment, the fifth structure comprises a plurality of triangles with an overlapping vertex.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

FIGS. 1 to 11 illustrate an embodiment of a music learning aid 100. The learning aid 100. As will be evident from the foregoing sections, embodiments of the presently described music learning aid 100 may be realised by either providing the learning aid in the form of a stacked wheel assembly (best shown in FIGS. 1 to 11) or by electronic means shown in FIGS. 12 and 13. The electronic means include, but not limited to, Internet web application running within a web page and accessible through an Internet browser running in a personal computer or laptop computer, a software application installed running in a computing device, mobile application (apps) running within a mobile computing/communication device such as the Apple® iPad®, Apple iPhone®, Samsung® Galaxy®, Google Nexus®, and other commercially available devices.

Figure 1:
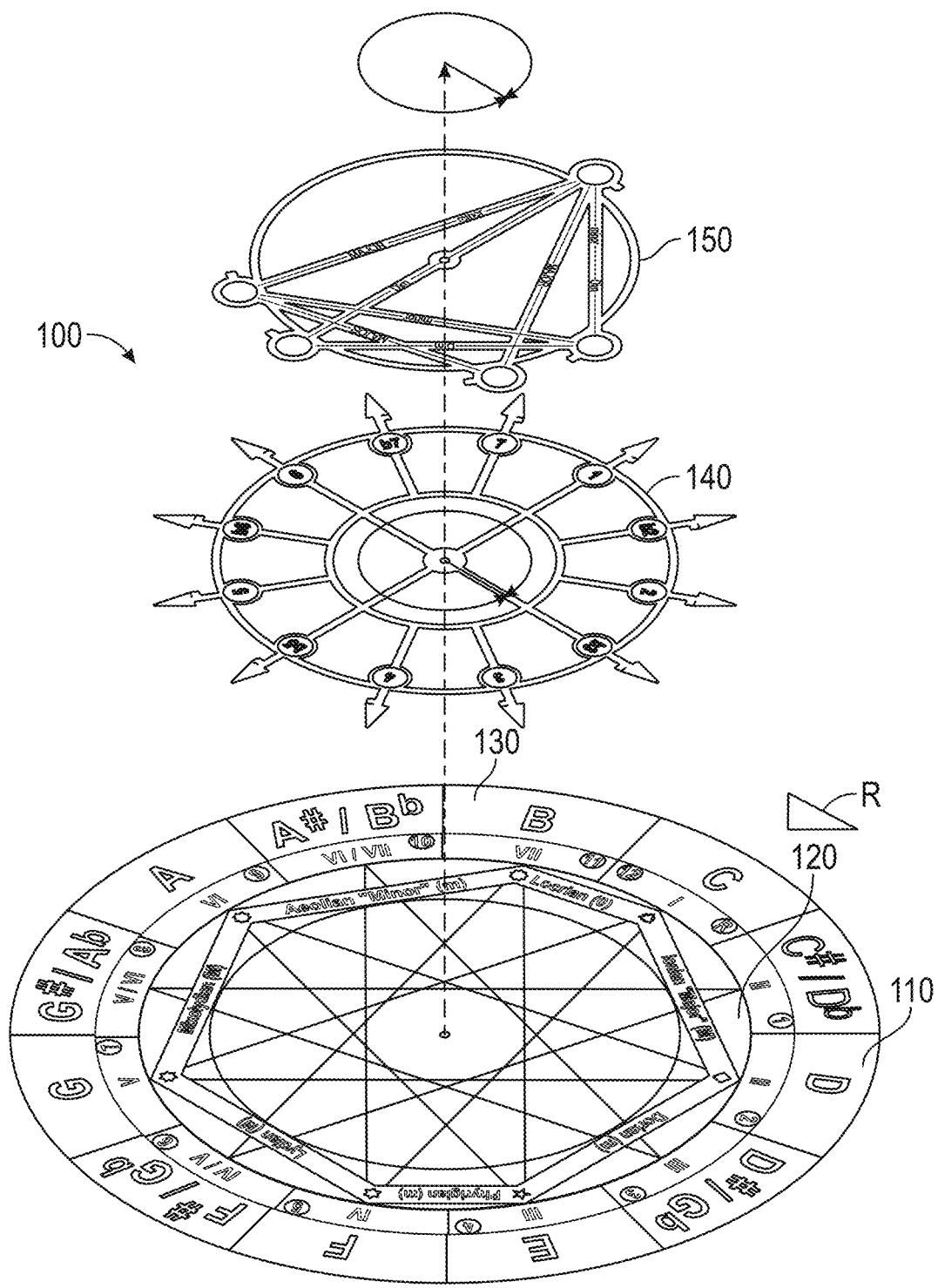
FIG. 1 is an exploded view of a music learning aid 100 in accordance with an embodiment.
Figure 2:
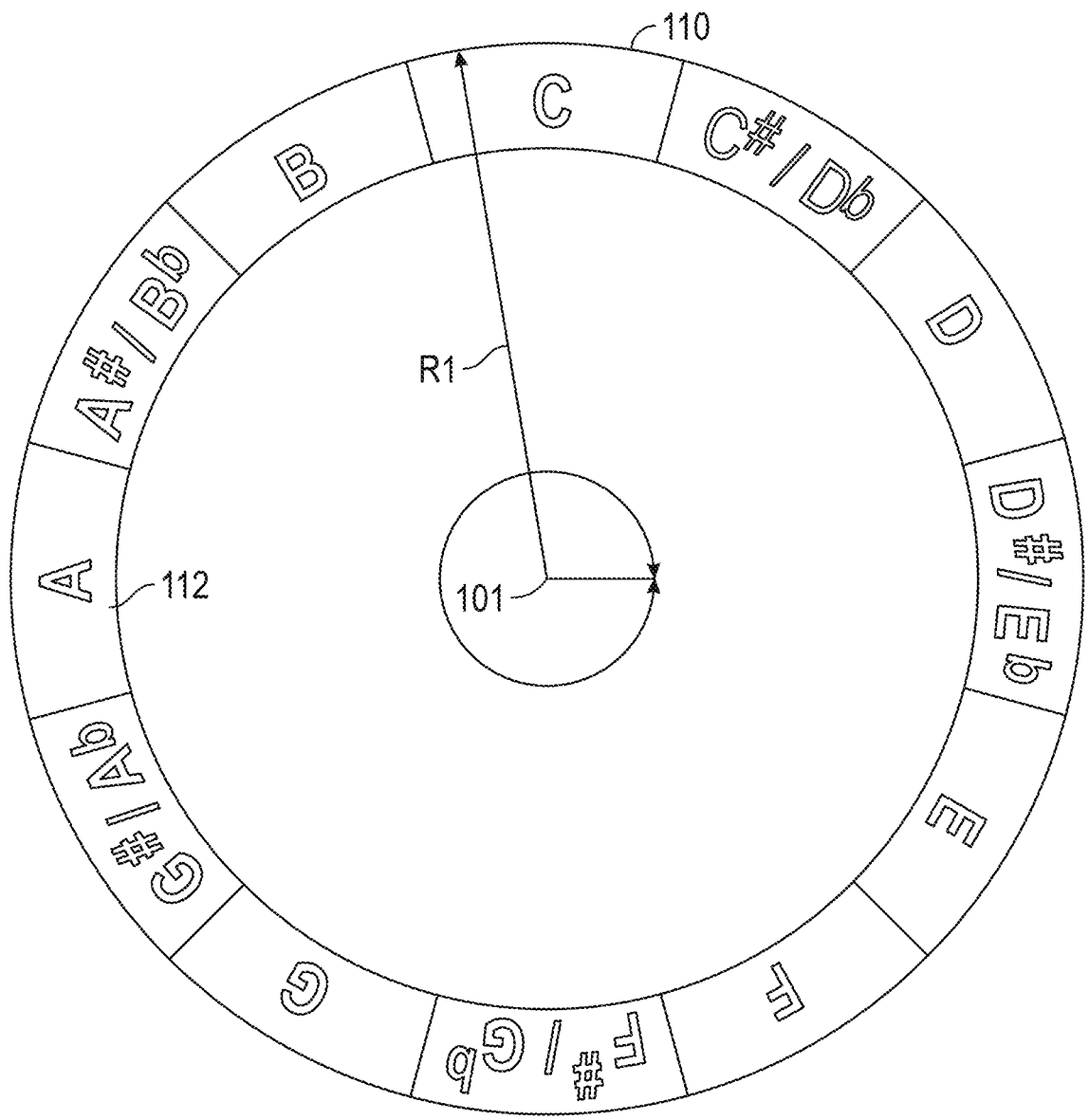
FIG. 2 is an enlarged view of the first wheel 110.
Figure 3:
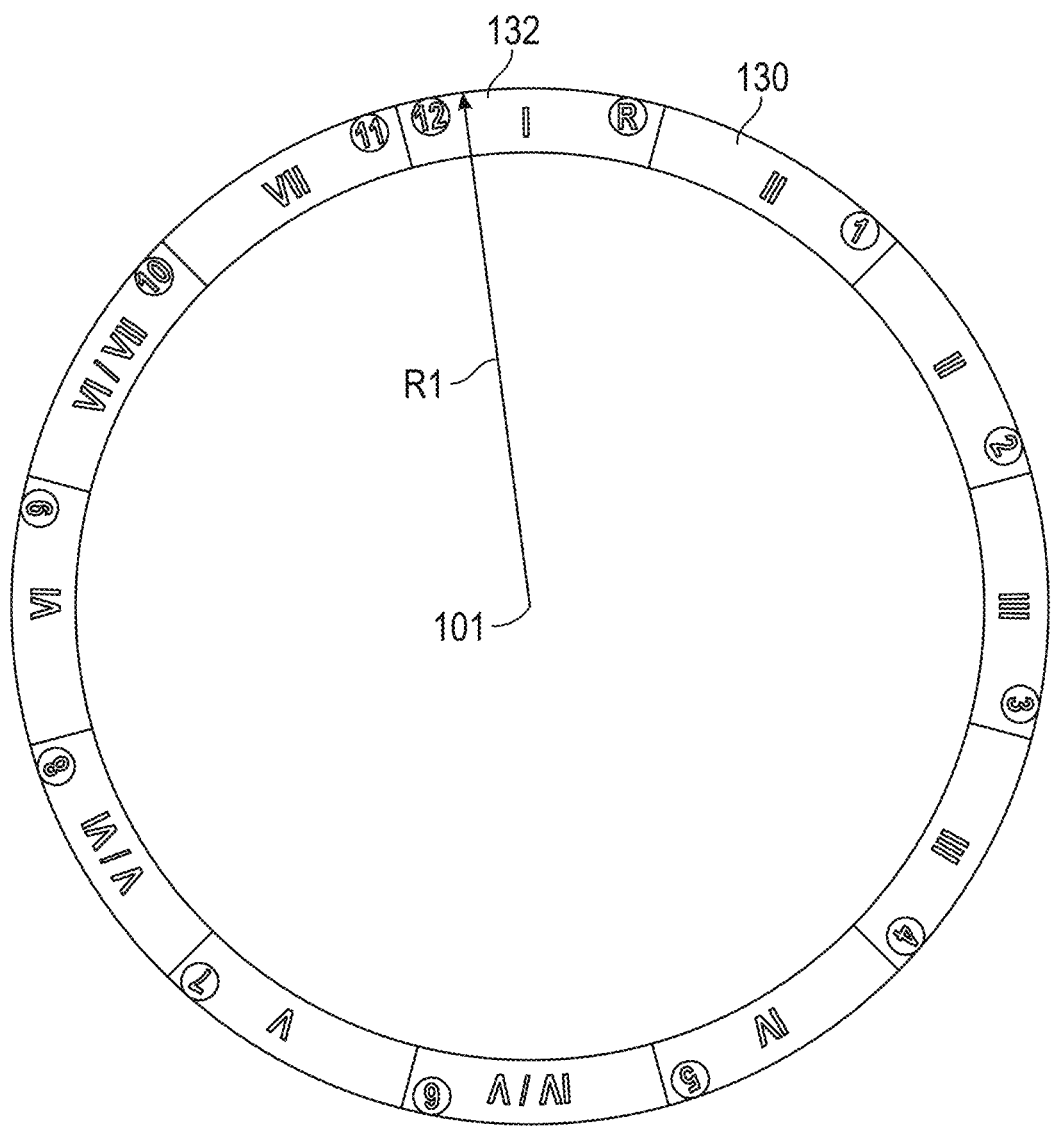
FIG. 3 is an enlarged view of the second wheel 120.
Figure 4:
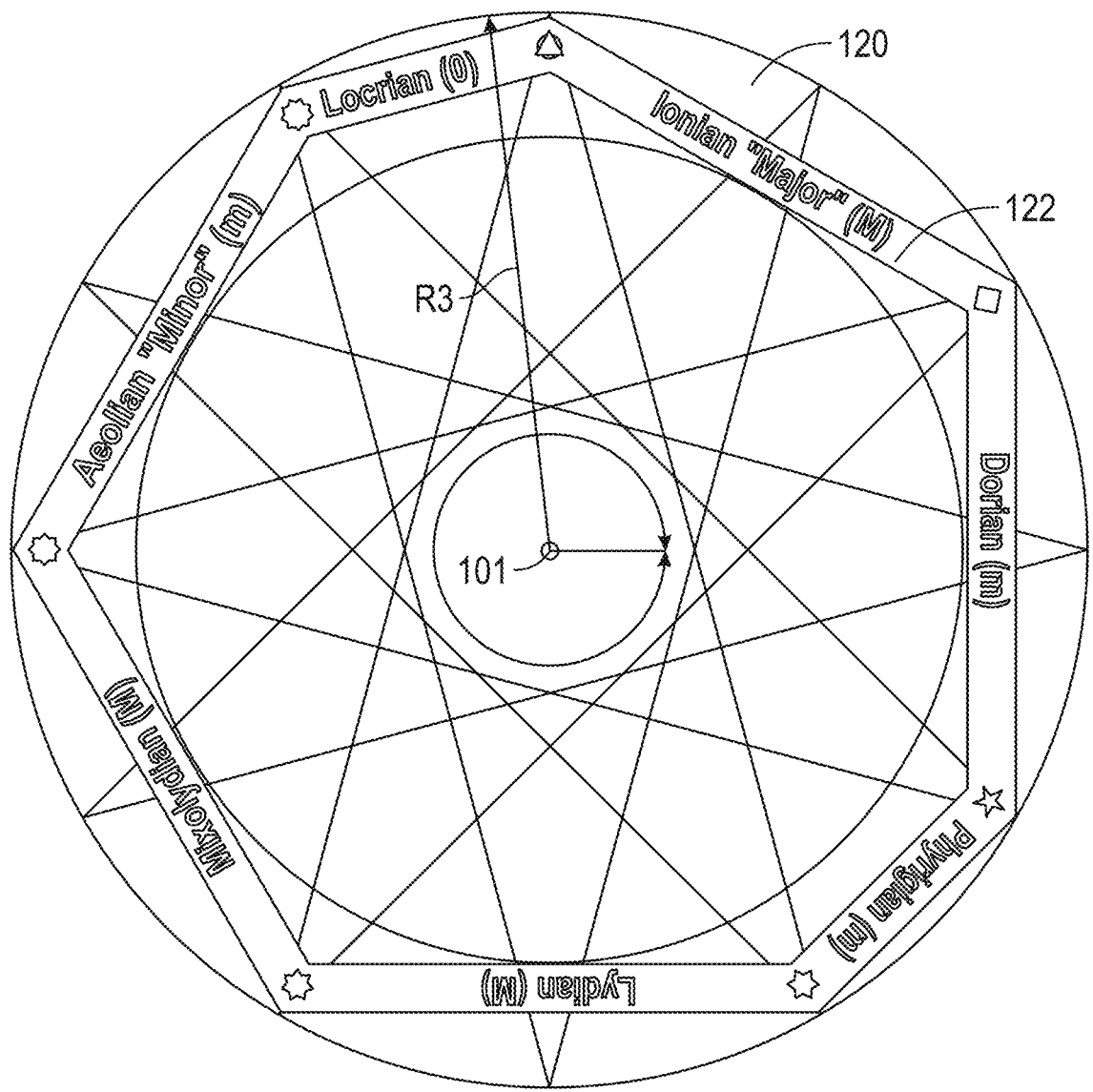
FIG. 4 is an enlarged view of the third wheel 130.

For ease of understanding, we will initially refer to the music learning aid shown in FIGS. 1 to 11. The music learning aid 100 comprises a plurality of substrates, specifically substrates in the form of wheels 110, 120, 130, 140 and 150 that are arranged in a concentric manner in a layered or stacked arrangement (best shown in FIG. 1 and FIGS. 7 to 11). An exploded view of the music learning aid 100 is shown in FIG. 1. The learning aid 100 comprises a first rotatable circular substrate in the form of a first circular wheel 110 having a radius (R1). A detailed view of the first circular wheel 110 is shown in FIG. 2. The first wheel 110 is provided with an in-use first visible circular scale 112 (preferably along a circumferential portion) displayed on the first wheel 110. The visible display 112 on the first wheel 110 is divided into twelve equally spaced segments and each segment is provided with an indicium for indicating the twelve musical tones from the chromatic scale which ascend in frequency in a clockwise direction. Therefore, throughout the specification, the first wheel 110 may also be referred to as the chromatic wheel 110. At least the visible display 112 is arranged to undergo a rotational movement in a clockwise and anticlockwise direction about a centre-point 101 of the first wheel 110. Such rotational movement of the visible display 112 may be achieved by positioning the first wheel 110 within a circular groove to allow rotation. Alternatively, the first wheel 112 may be provided in the form of a circular substrate that can rotate about the centre-point 101 by fastening the circular substrate on an underlying base by using a fastening mechanism to effect clockwise or anti-clockwise movement of the visible display 112. The Chromatic Scale Wheel 110 displays to the user the names of all the notes that comprise the 12 equal temperament tuning system, most commonly used in western music. The notes are arranged sequentially ascending in frequency in the clockwise direction and descending in the counter-clockwise direction. This wheel is freely rotatable around its centre point 101.

The music learning aid 100 also includes a second circular substrate in the form of a circular wheel 120 (detailed views shown in FIG. 4) having a radius (R3) that is less than the radius (R1) of the first wheel 110. It is important to note that the aforementioned configuration related to the difference in radii between the first wheel 110 and the second wheel 120 is not limiting. The second wheel 120 is concentrically arranged relative to the first wheel 110 and is coupled with the fastening arrangement to enable rotation of the second wheel 120 relative to the first wheel 110 and any underlying substrate. The wheel 120 comprises a polygon 122 with vertices of the polygon being located along the circumference of the second wheel 120. Each of the vertices of the polygon in the second wheel 120 represent a musical mode from the following set of modes: Ionian, Dorian, Phyrigian, Lydian, Mixolydian, Aeolian and Locrian. The second wheel 120 is provided with indicia to associate each of the vertices with a respective musical mode. In music theory certain notes are more harmonious with one another than other notes. The second wheel 120 may also be referred to as the Scale, Shape and Modes wheel because during use, it displays to the user the distribution of these harmonious notes and the shape it creates. Each vertices of the polygon on the second wheel is labelled with the name of the mode associated with that root position, as well as the structure of its relative chord.

TABLE 1

| Semitones | Roman Numerals | Scale Degree Names | Intervals | Solfège |
|---|---|---|---|---|
| 0 | I | Tonic | Perfect Unison (Half Tone) | Do |
| 1 | bII | Semitone | Minor second (Whole Tone) | |
| 2 | II | Supertonic | Major second | Re |
| 3 | bIII | Mediant | Minor third | |
| 4 | III | Mediant | Major third | Mi |
| 5 | IV | Subdominant | Perfect fourth | Fa |
| 6 | #IV/bV | Tritone | Triton | |
| 7 | V | Dominant | Perfect fifth | So |
| 8 | #V/bVI | Submediant | Minor sixth | |
| 9 | VI | Submediant | Major sixth | La |
| 10 | bVII | Subtonic | Minor seventh | |
| 11 | VII | Leading tone | Major seventh | Ti |
| 12 | VIII | Tonic (octave) | Perfect Octave | Do |

The music learning aid 100 also includes a third circular substrate in the form of a third circular wheel 130 (detailed views shown in FIG. 3) having a radius (R2) that is less than the radius (R1) of the first wheel 110 and greater than the radius (R3) of the second wheel 120. The third wheel 130 is also arranged to be substantially concentric relative to the first and second wheels 110 and 120 respectively. Unlike the first and second wheels 110 and 120, the third wheel 130 is fixed (non-rotatable) relative to the first and second wheels 110 and 120. The third wheel 130 includes a third in-use visible circular scale 132 which divides the circumferential region of the third wheel 130 into twelve equal segments comprising indicia for indicating corresponding musical scale degrees such that the musical scale degrees indicated in the third visible scale 132 ascend in frequency in a clock-wise or anti-clockwise direction. The third wheel 130 displays to the user in roman numerals the potential scale degrees of the various modes relative to the tonic note. The third wheel also displays in numbers the degrees of semitones away from the tonic. This wheel is fixed in position with the 1st degree tonic positioned aligned to the 12 o'clock reference position (see FIG. 1). It is however important to note that the third circular wheel 130, in other embodiments, may denote scale degrees or intervals and is no way limited to the use of Roman numerals and semitones. As shown in Table 1 above, Roman Numerals may be replaced by Scale Degree Names or Intervals or Solfège in other embodiments without departing from the spirit and scope of the invention.

Figure 5:
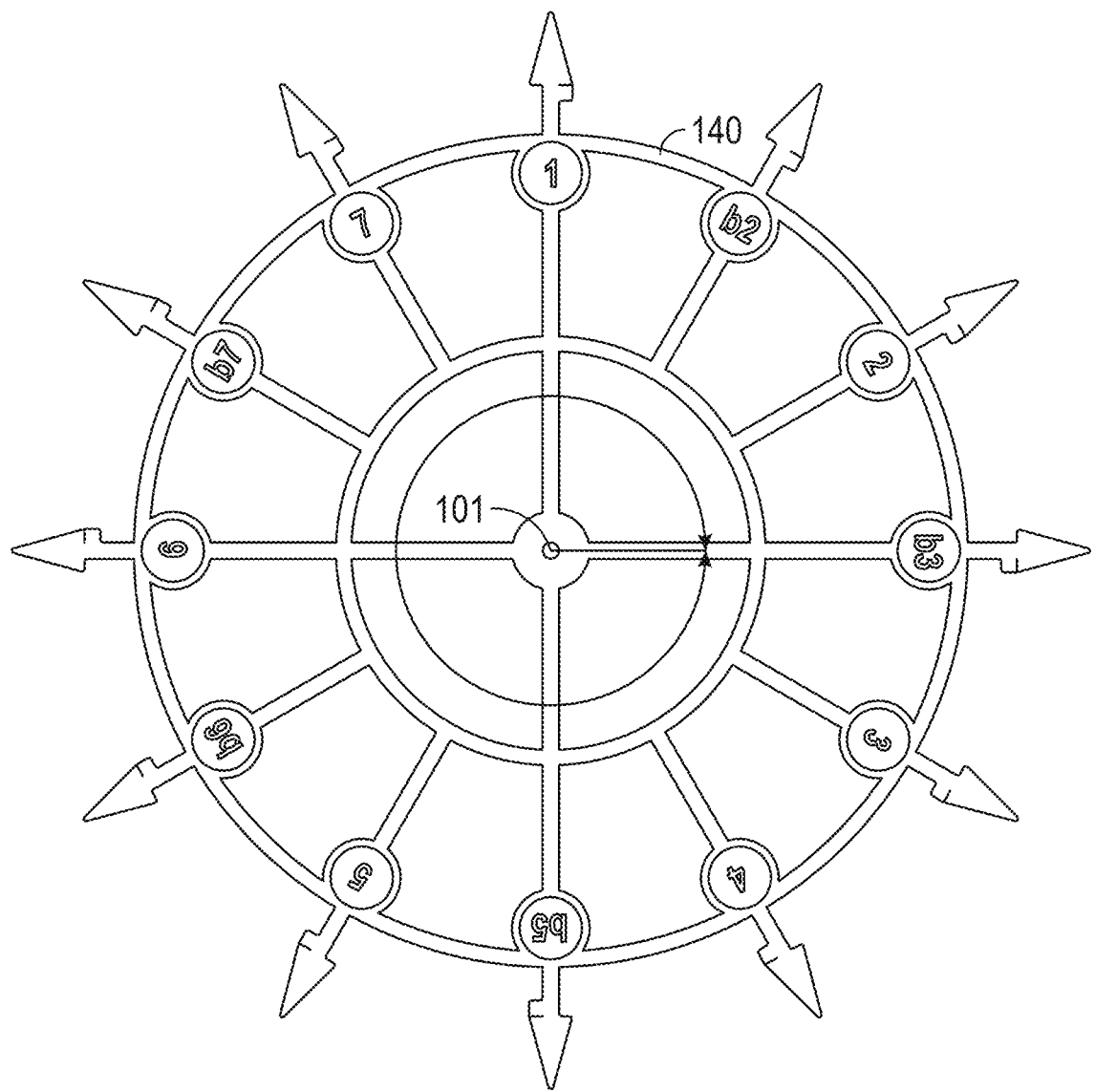
FIG. 5 is an enlarged view of the fourth wheel 140.
Figure 6:
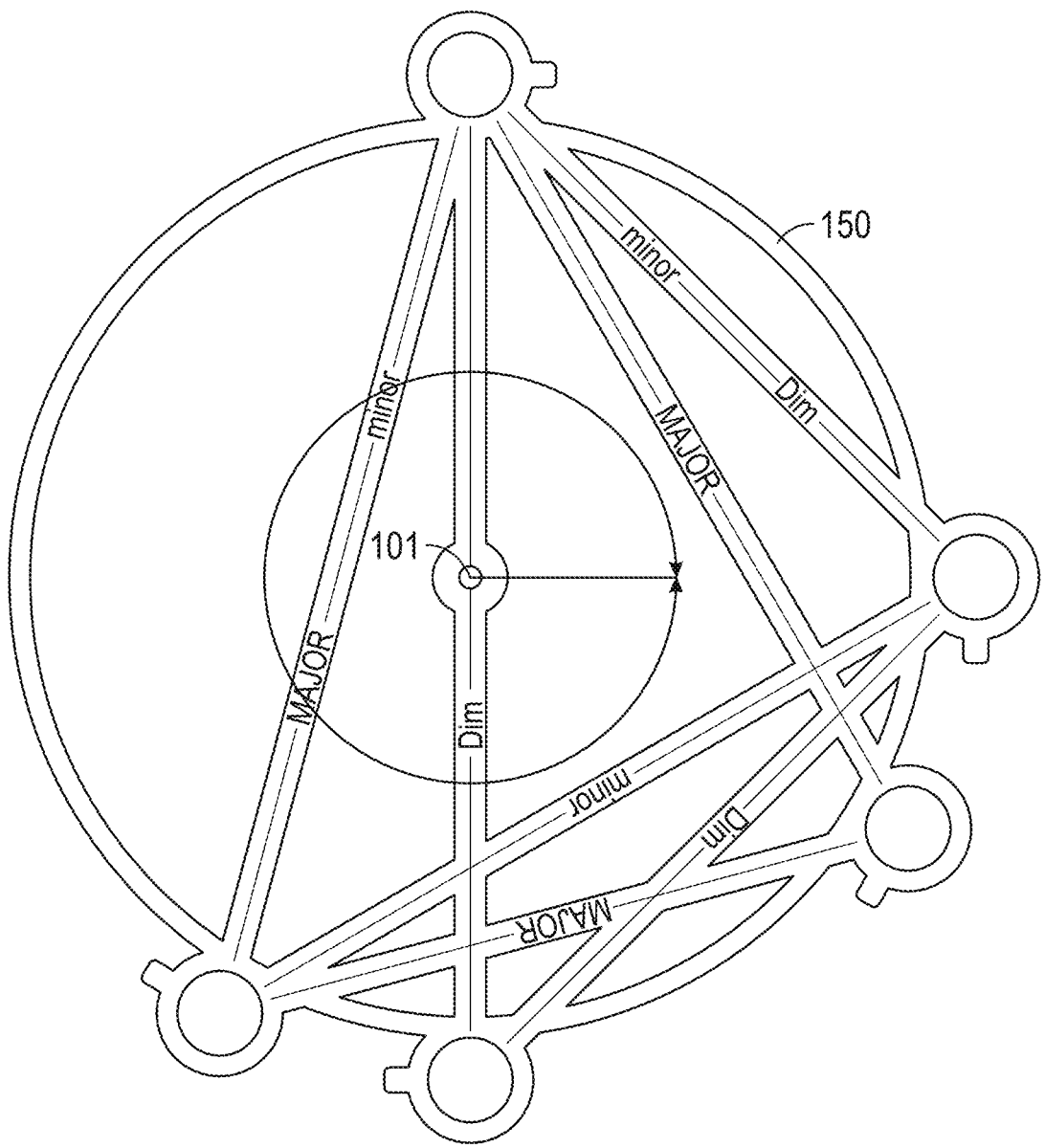
FIG. 6 is an enlarged view of the fifth wheel 150.

Turning specifically to FIG. 5, the music learning aid 100 includes a fourth substrate in the form of a fourth wheel 140 that is also arranged to be substantially concentric relative to the first, second and third wheels 110, 120 and 130. The fourth wheel 140 is fastened by the fastening arrangement to enable the fourth wheel 140 to rotate relative to the first, second and third wheels 140. The fourth wheel 140 comprises a plurality of chord degree indicators provided on a circular scale such that the chord degrees indicated by each indicator ascend in a clockwise or anticlockwise direction. Therefore, the fourth wheel 140 may also be referred to as the Chord degree wheel throughout the specification. The fourth wheel 140 displays to the user the names commonly used in music theory to describe the chord degree associated with that position. These names are relative to the scale degrees of the Ionian/Major Scale. In the preferred embodiment, radially outwardly extending pointers 142 are provided whereby each pointer corresponds to a chord degree indicated by a respective chord degree indicator.

Figure 13:
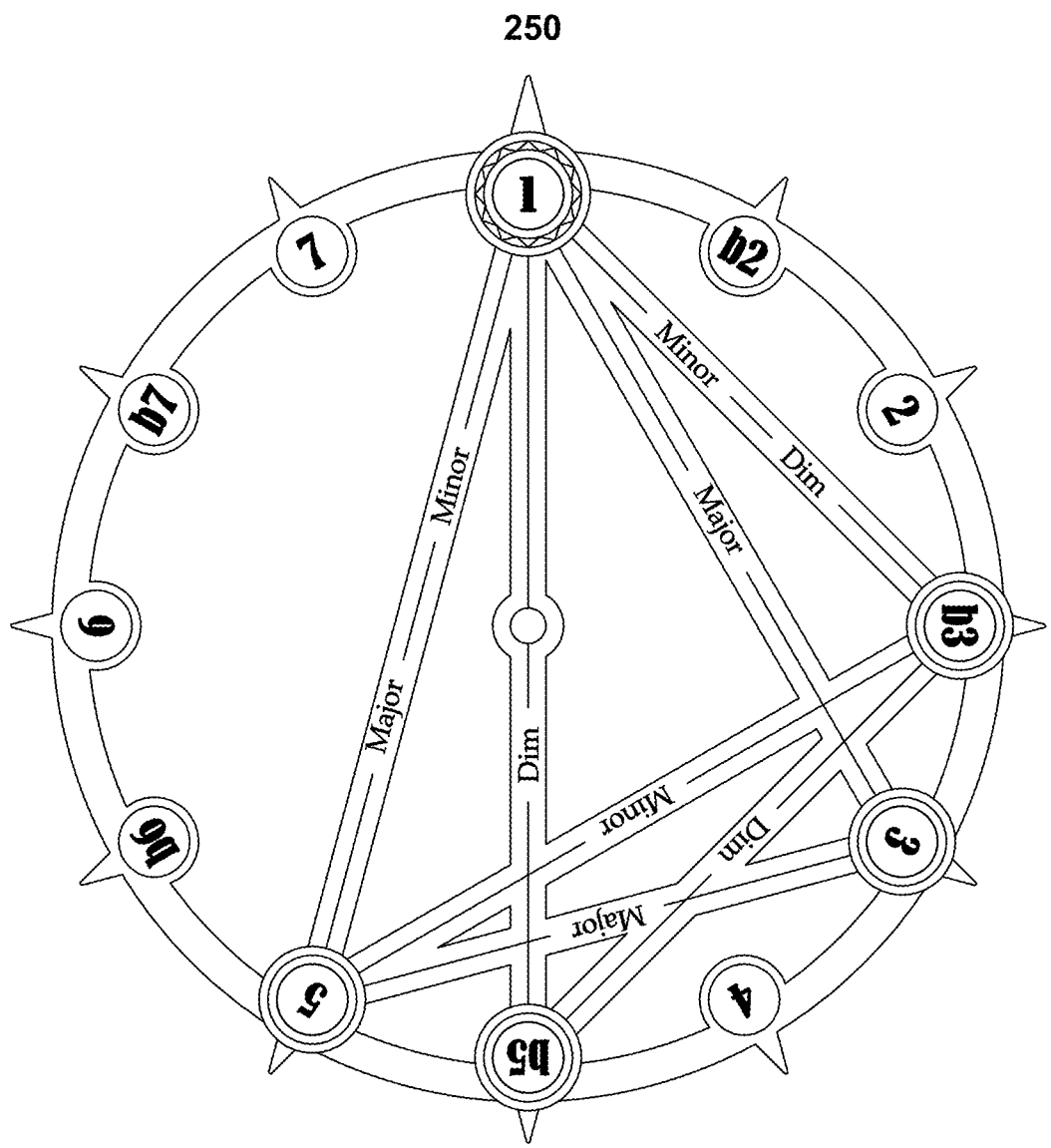
FIG. 13 is an alternative embodiment that shows a combined wheel 250 that incorporates the fourth wheel 140 and fifth wheel 150 shown in FIGS. 5 and 6.

Finally, the music learning aid 100 also includes a fifth substrate or fifth wheel 150 comprising a plurality of triangles wherein vertices of all of said triangles lie on the same imaginary circle and wherein the plurality of triangles, namely three triangles comprise an overlapping vertex (referred to as the root) with the centre of the imaginary circle lying within the area bound by the plurality of triangles. The centre 101 of the fifth wheel 150 is fastened relative to the first, second, third and fourth wheel 110, 120, 130 and 140 to enable rotation of the fifth wheel 150. Each of the three triangles denotes a specific chord shape and may therefore be referred to as the Chord Shape wheel. The fifth wheel 150 displays to the user the consistent shapes created by the distributions of the notes within various chord structures. As well as the names of the different chord structure. In some embodiments, the fourth wheel 140 and the fifth wheel 150 may be combined to provide a more compact version 250 or embodiment of the music learning aid 100 as shown in FIG. 13.

Referring to FIG. 1, the first three wheels 110, 120 and 130 are arranged concentrically on the same plane starting from the Outermost Chromatic Wheel 110, into the Scale and Semitone Degree Wheel 130 and then the Scale Shape and Modes Wheel 120. The Chord Degree Wheel 140 is then overlayed on top of these, and the Chord shape wheel 150 is overlayed on the Chord Degree Wheel 140 all sharing the common centre point 101. As previously described each wheel is independently rotatable excluding the Scale and Semitone Degree Wheel 130 which is fixed in place.

Method of Use

The following passages will now denote some exemplary and non-limiting methods of using the music learning aid 100.

Exemplary Method 1

Figure 7:
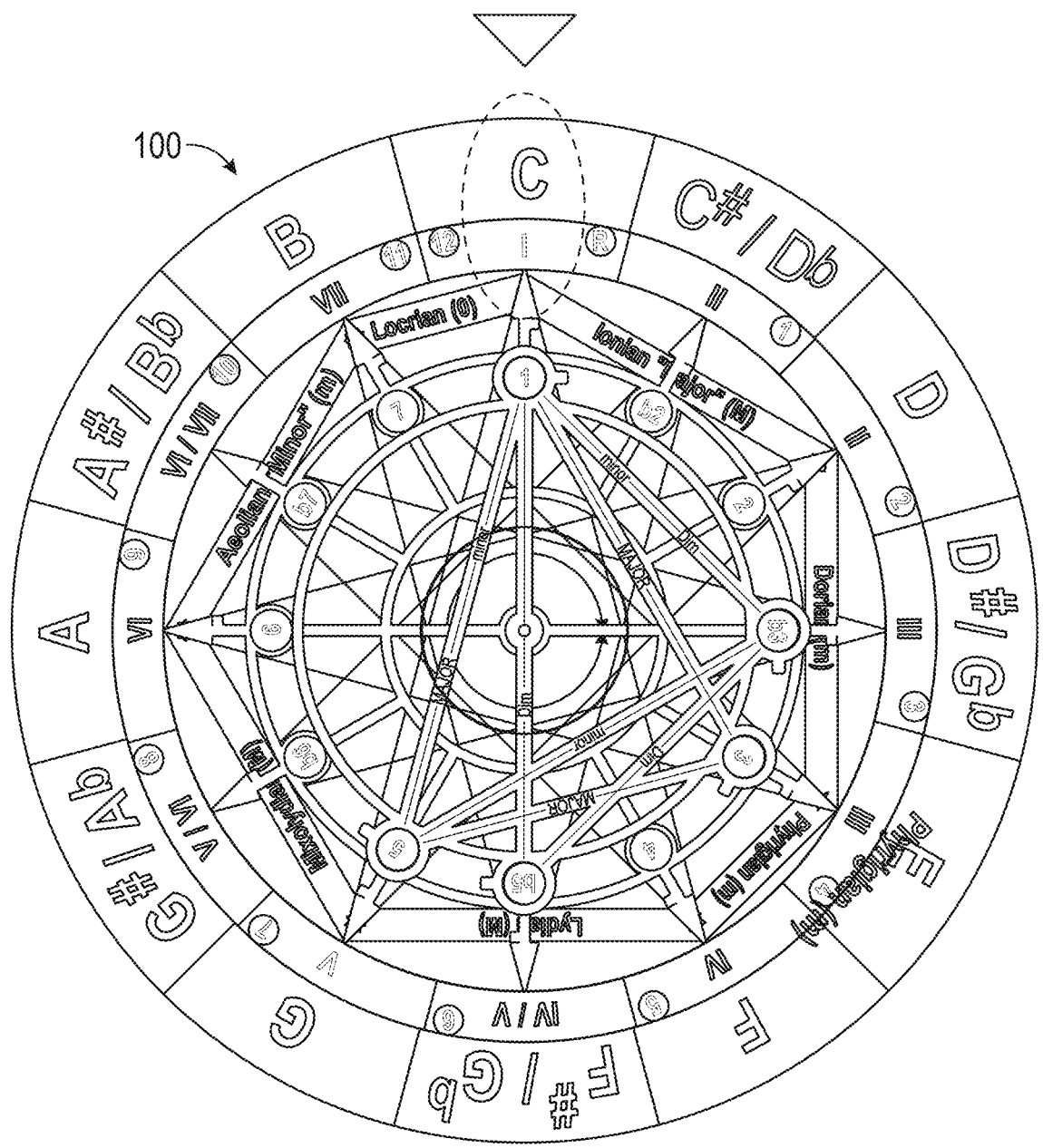
FIGS. 7 to 9 show several in-use positions of the music learning aid 100 in accordance with a first exemplary method of use.
Figure 8:
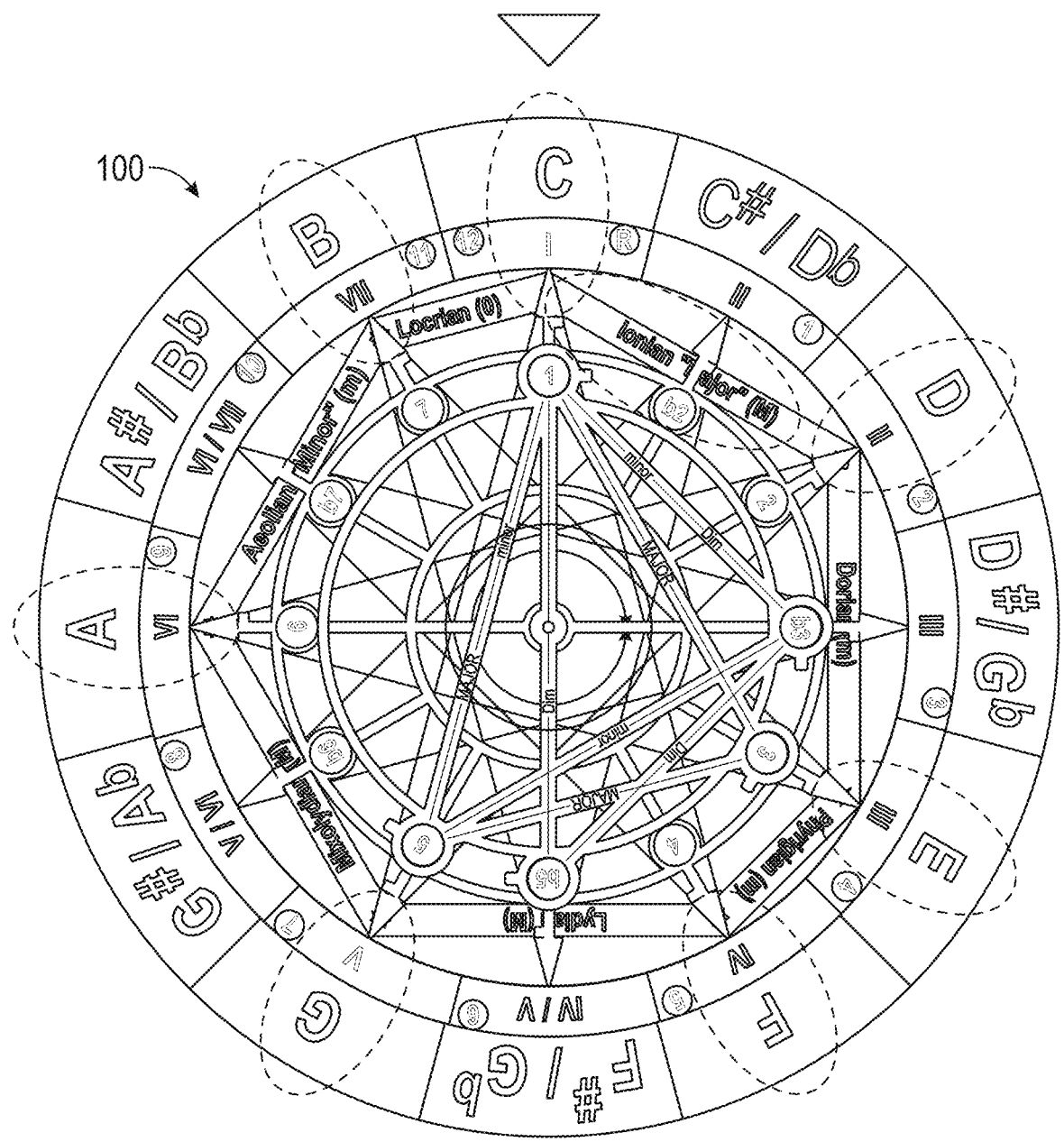
Figure 9:
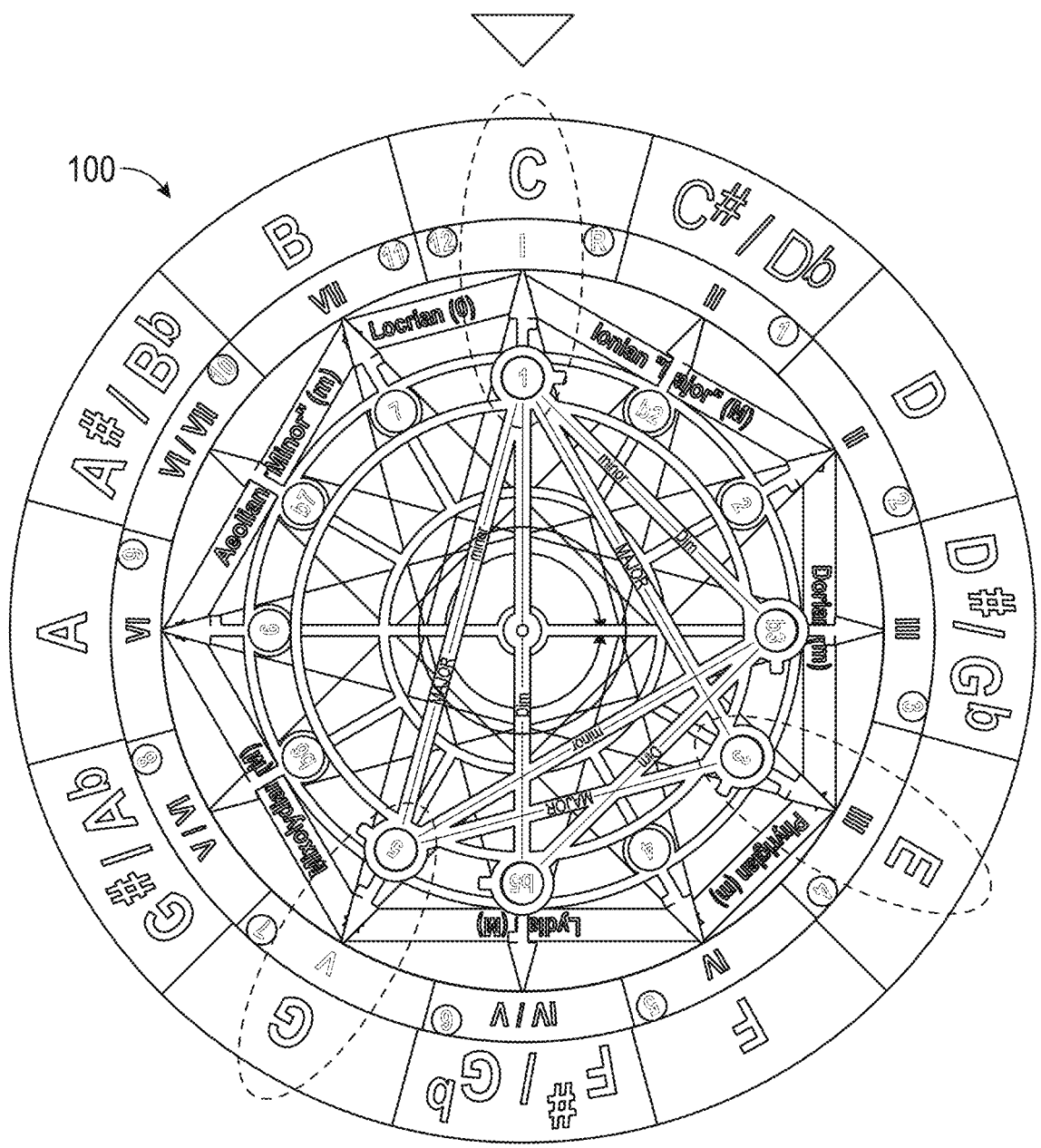

Referring to FIG. 7, in a first step, the user may align their desired tonic note on the chromatic scale wheel 110 to the 12 o'clock reference position. In this example, the C is the tonic of the key that user wishes to explore (as highlighted in FIG. 7).

The Chromatic Scale Wheel 110 in conjunction with the Scale and Semitone Degree Wheel 130, now indicate to the user the relative semitone degrees for all the notes of the chromatic scale relative to the tonic in order of ascending pitch. The potential scale degrees of the various modes of western music theory are also indicated. In a second step (See FIG. 8), the user may then move the Scale Shape and Modes Wheel 120 to position their desired Mode on the Scale Shape and Modes Wheel by aligning the relevant vertex to the 12 o'clock reference position. In this example the user has chosen to explore an Ionian/Major Mode. Therefore, in FIGS. 7 and 8, the music learning aid 100 is positioned in the Key of "C" Ionian/Major. The Vertices on the Scale Shape and Mode Wheel 120 now indicate to the user the positions of all the notes within the desired mode. In conjunction with the Chromatic wheel 110 and Scale & Semitone Degree Wheel 130 the user can now decipher the Names of all the notes in their desired key, their relative Scale degree, and degrees of semitones from the tonic as well as the relative chord of each note in the key as shown on the Scale Shape and Modes Wheel 120. In the above Example we can see that the Key of "C" Ionian/Major consists of the Following information.

| Scale Degree | I | II | III | IV | V | VI | VII |
|---|---|---|---|---|---|---|---|
| Notes | C | D | E | F | G | A | B |
| Semitone Degree | R | 2 | 4 | 5 | 7 | 9 | 11 |
| Relative Chord | C Maj | Dm Min | Em Min | F Maj | G Maj | Am Min | B° Dim |

In a third step (See FIG. 9), the user may investigate the various chords that constitute the key that they are exploring and for doing so they may simply align the root position of the Chord Degree wheel 140 and the root position of the Chord Shape Wheel 150 to the corresponding note they wish to investigate on the Chromatic Scale Wheel 110. In the exemplary method shown in FIG. 9, In this example we are exploring the relative chord of the "C" tonic of the Ionian/Major Key. The user can see that that the relative chord is a C Major chord consisting of the notes C, E, G because the vertices of the triangle (on wheel 150) which denote the major cord point to the notes C, E and G with respective chord degrees of 1, 3, 5.

Exemplary Method 2

Figure 10:
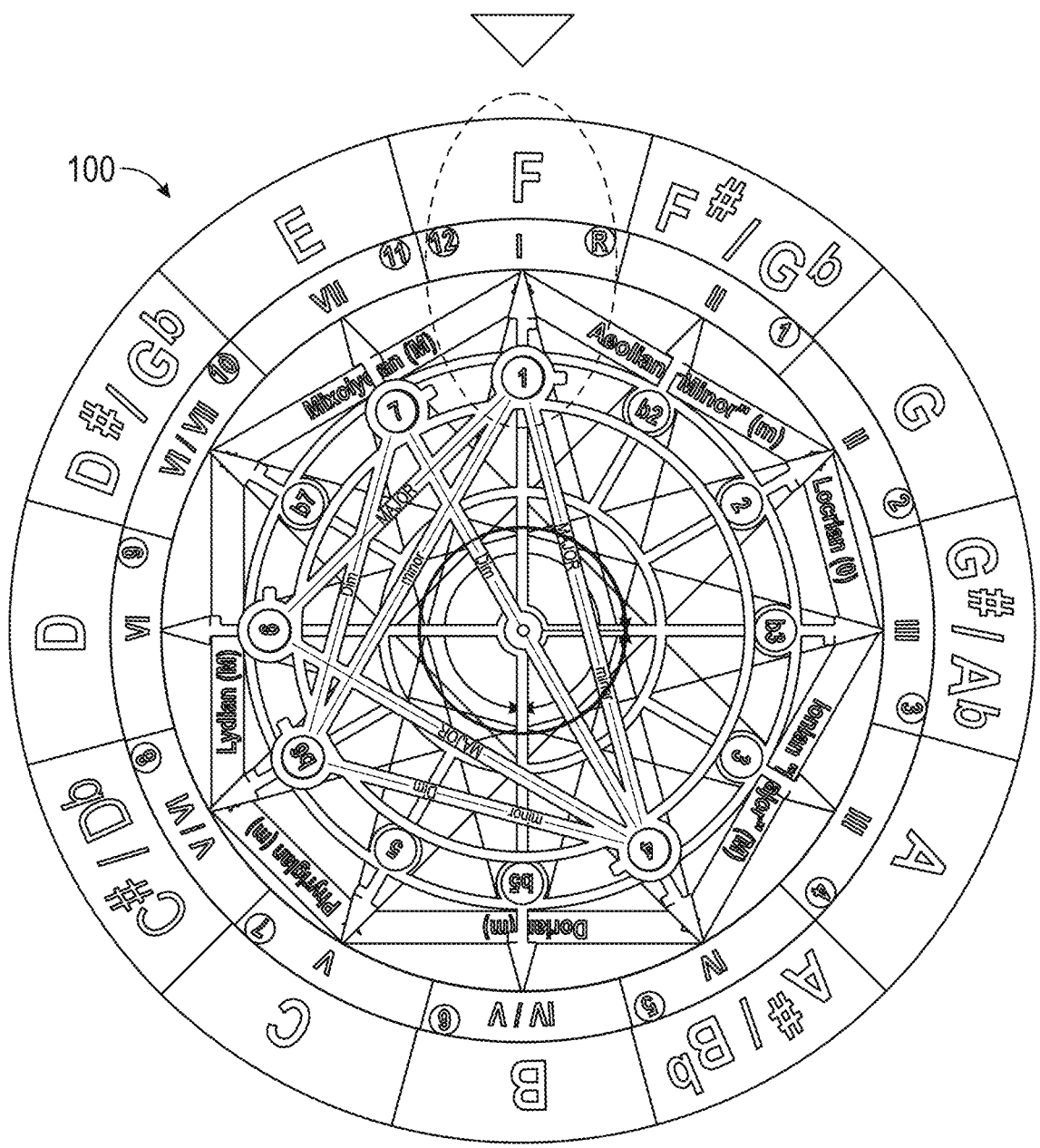
FIGS. 10 and 11 show several in-use positions of the music learning aid 100 in accordance with a second exemplary method of use.
Figure 11:
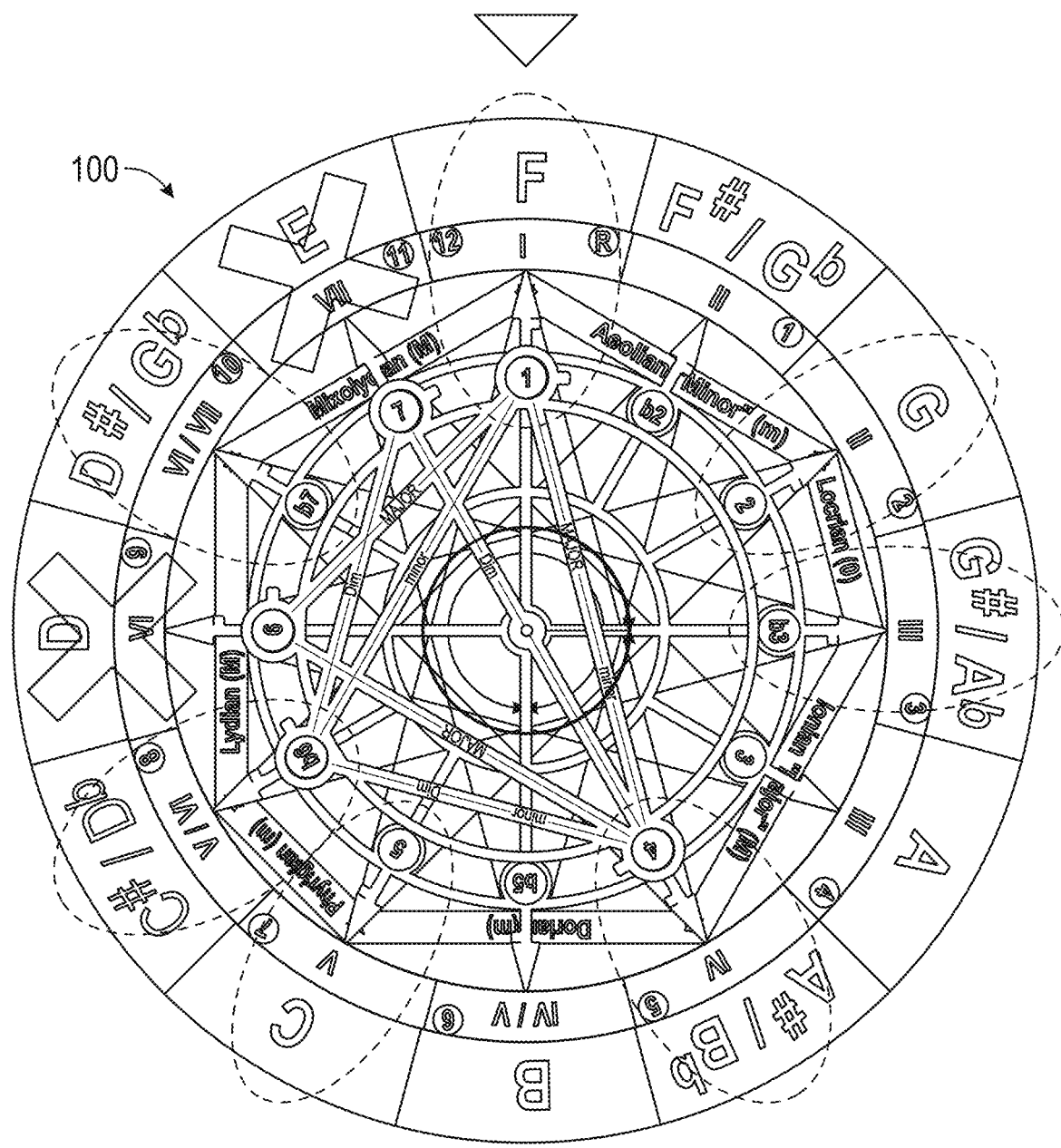

In a second exemplary method shown in FIG. 11, the user may align the "F" note as the tonic note by positioning the chromatic scale wheel 110 to position the "F" note at the 12 o'clock reference position. The scale and shape wheel 120 may then be aligned to position the vertex denoting the Aeolian/Minor mode at the reference position as shown in FIG. 10. Upon examining the learning aid 100, the user can now identify the following information about the key of "F" Aeolian/Minor.

| Scale Degree | I | II | III | IV | V | VI | VII |
|---|---|---|---|---|---|---|---|
| Notes | F | G | G# | A# | C | C# | D# |
| Semitone Degree | R | 2 | 3 | 5 | 7 | 8 | 1o |
| Relative Chord | Fm Min | G° Dim | G# Maj | A#m Min | Cm Min | C# Maj | D# Maj |

In this exemplary method, the root positions on Chord Wheels 140 and 150 have been moved to investigate the relative chord of the A♯, the IV degree of the key as shown in the third wheel 130. The Scale Shape and modes wheel 120 has identified this as a minor chord structure. By examining the learning aid 100, the notes of the A♯m chord can be identified as A♯, C♯, F the 1st, b3rd, 5th (as identified by the grey oval) chord degrees respectively. It is important to note that the A♯ can neither make a Major or Diminished chord structure in this key as the notes pertaining to the b3rd and b5th (as identified by the red cross) chord degrees do not constitute the A♯ Aeolian/Minor Key. Furthermore the user can identify the other notes of the key that they may wish to experiment with incorporating into the Am chord (as identified by the green ovals) to create more different chords that are harmonious within this key.

Figure 12:
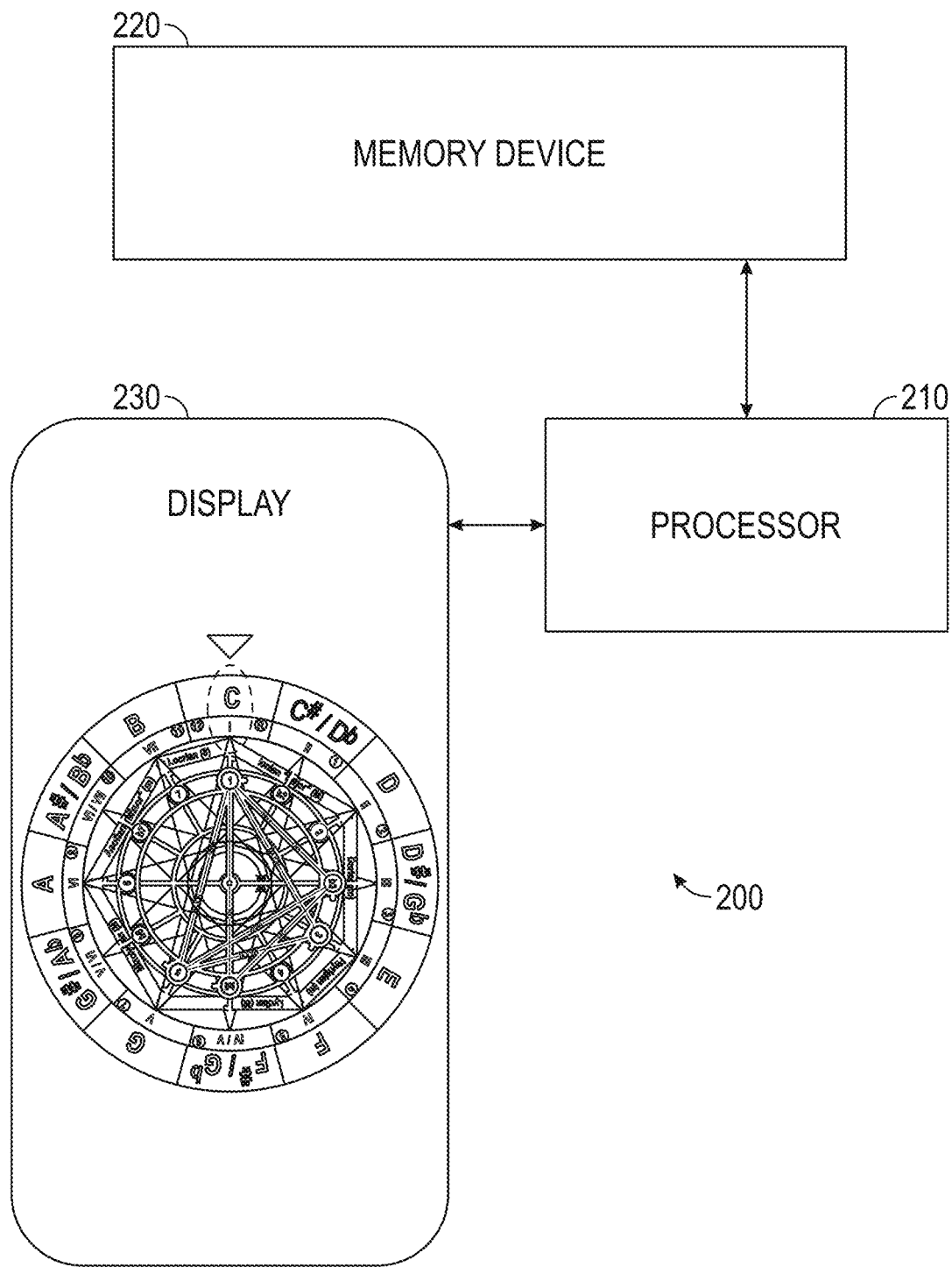
FIG. 12 is a schematic view of a system 200 for visualising the music learning aid 100.

In another embodiment, the music learning aid 100 as described herein may be visualised by utilising a system 200 as shown in FIG. 12. The system 200 includes a processor 210 in communication with a display screen 230, the processor 210 being arranged to execute machine readable instructions stored on a non-volatile memory device 220 to display the music learning aid 100 described herein. Specifically, the instructions are used for displaying the first wheel 110 in the form of a first rotatable circular structure having a radius (R1) with the first centre point 101. The instructions are also used for displaying the second wheel 120, the third wheel 130, the fourth wheel 140 and the fifth wheel 150 in a concentric arrangement to simulate the appearance of the music learning aid 100 described in the previous sections. An input interface may be provided to allow a user to effect rotation of each of the first, second, fourth and fifth wheels about the centre point 101 in a clockwise or anti-clockwise direction. In the preferred embodiment, the display device 230 may take the form of a touch screen interface that allows the user to touch the visible portions of the first, second, fourth and fifth wheel to effect rotation of these wheels to visualise the music learning aid 100.

FIG. 12, particularly the display device 230 shows the main graphical user interface of an electronic embodiment of the Music learning aid 100 implemented as a mobile application (apps) for an amateur or beginner musician in accordance with system 200.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

The invention claimed is:

1. A music learning aid, comprising:
    a first rotatable circular substrate having a radius (R1) comprising an in-use first visible circular scale displayed on the first substrate, the visible display comprising a plurality of indicia for indicating corresponding musical notes such that the musical notes indicated in the visible display scale ascend in frequency in a clock-wise or anti-clockwise direction;
    a second circular substrate having a radius (R3), the second substrate being arranged to be substantially concentric and rotatable relative to the first substrate by a fastening arrangement to enable the second substrate to rotate relative to the first substrate, the second substrate comprising a polygon with vertices of the polygon being located along the circumference of the second substrate, the second substrate comprising respective indicia corresponding to each of the vertices for indicating a respective musical mode selected from a set of a plurality of musical modes including but not limited to the following modes: Ionian, Dorian, Phyrigian, Lydian, Mixolydian, Aeolian and Locrian.

2. A music learning aid in accordance with claim 1 wherein the polygon is structured such that when one of the vertices of the polygon of the second substrate is pointed towards a key musical note indicated on the visible display scale of the first substrate, the other of remaining vertices of the polygon on the second substrate identify a position of the other key musical notes constituting the respective musical mode corresponding to said one of the vertices of the polygon of the second substrate.

3. A music learning aid in accordance with claim 1 further comprising a third circular substrate having a radius (R2), the third substrate being arranged to be substantially concentric and non-rotatable relative to the first substrate by the fastening arrangement to enable the first substrate to rotate relative to the third substrate, a third in-use visible circular scale displayed on the third substrate, the third visible display comprising indicia for indicating corresponding musical scale degrees or intervals or Solfège such that the musical scale degrees or intervals or Solfège indicated in the third visible scale ascend in frequency in a clock-wise or anti-clockwise direction.

4. A music learning aid in accordance with claim 1 further comprising: a fourth substrate being arranged to be substantially concentric and rotatable relative to the first, second and third substrate by the fastening arrangement to enable the fourth substrate to rotate relative to the first, second and third substrates, the fourth substrate comprising a plurality of chord degree indicators provided on a circular scale such that the chord degrees indicated by each indicator ascend in a clockwise or anticlockwise direction.

5. A music learning aid in accordance with claim 4 further comprising a plurality of radially outwardly extending pointers such that each pointer corresponds to a chord degree indicated by a respective chord degree indicator.

6. A music learning aid in accordance with claim 5 wherein each pointer comprises a length (l) which is sufficiently long to extend across a circumferentially outer portion of top surface portion of the third substrate.

7. A music learning aid in accordance with claim 1 further comprising: a fifth substrate comprising one or more triangles wherein all vertices of the one or more triangles lie on the same imaginary circle with the centre of the imaginary circle lying within an area bound by the one or more triangles, the centre of the fifth substrate being fastened to the first, second, third and fourth substrates by the fastening arrangement to allow rotation of the fifth substrate relative to the first, second, third and fourth substrates and wherein each triangle denotes a chord shape.

8. A music learning aid in accordance with claim 7 wherein the plurality of triangles comprise an overlapping vertex on the imaginary circle.

9. A music learning aid in accordance with claim 1 wherein the first visible circular scale is displayed on a circumferential portion of the first substrate.

10. A music learning aid in accordance with claim 1 wherein the second visible circular scale is displayed on a circumferential portion of the second substrate.

11. A system for visualising a music learning aid, the system comprising: a processor in communication with a display screen, the processor being arranged to execute machine readable instructions to display:
a first rotatable circular structure having a radius (R1) with a first centre point, the first structure comprising an in-use first visible circular scale displayed on the first structure, the visible display comprising a plurality of indicia for indicating corresponding musical notes such that the musical notes indicated in the visible display scale ascend in frequency in a clock-wise or anti-clockwise direction;
a second circular structure having a radius (R3), the second structure being arranged to be substantially concentric relative to the first structure, the second structure comprising a polygon with vertices of the polygon being located along the circumference of the second structure, the second structure comprising respective indicia corresponding to each of the vertices for indicating a musical mode from the following set of modes including Ionian, Dorian, Phyrigian, Lydian, Mixolydian, Aeolian and Locrian; and
wherein the each of the first and second structures as displayed on the display screen comprises input interface adapted to receive user input to effect rotation of the second structure and the first structure about the centre point.

12. A system for visualising music in accordance with claim 11 wherein the processor is arranged to execute machine readable instructions to further display the polygon such that when one of the vertices of the polygon of the second substrate is pointed towards a key musical note indicated on the visible display scale of the first substrate, the other of remaining vertices of the polygon on the second substrate identify a position of the other key musical notes constituting the respective musical mode corresponding to said one of the vertices of the polygon of the second substrate.

13. A system in accordance with claim 11 wherein the processor is arranged to execute machine readable instructions to further display: a third circular structure having a radius (R2) that is less than the radius (R1) of the first rotatable circular substrate and greater than the radius (R3) of the second structure, the third structure being arranged to be substantially concentric relative to the first and second structures, the third structure comprising an in-use visible circular scale displayed on the third substrate, the third visible display comprising indicia for indicating corresponding musical scale degrees or intervals or Solfège such that the musical scale degrees or intervals or Solfège indicated in the third visible scale ascend in frequency in a clock-wise or anti-clockwise direction.

14. A system in accordance with claim 11 wherein the processor is arranged to execute machine readable instructions to further display a fourth structure being arranged to be substantially concentric and rotatable relative to the first and second structures, the fourth structure comprising a plurality of chord degree indicators provided on a circular scale such that the chord degrees indicated by each indicator ascend in a clockwise or anticlockwise direction and wherein the fourth structure as displayed on the display device comprises an input interface adapted to receive user input to effect rotation of the fourth structure about the centre point.

15. A system in accordance with claim 11 wherein the processor is arranged to execute machine readable instructions to further display a fifth structure comprising one or more triangles wherein all vertices of the one or more triangles lie on the same imaginary circle with the centre of the imaginary circle lying within an area bound by the one or more triangles, each triangle denoting a chord shape and wherein the fifth structure as displayed on the display screen comprises an input interface adapted to receive user input to effect rotation of the fifth structure about the centre point.

16. A system in accordance with claim 15 wherein the processor is arranged to execute machine readable instructions to display a plurality of the triangles on the fifth substrate, the plurality of triangles comprising an overlapping vertex on the imaginary circle.

17. A method for visualising a music learning aid, the method comprising the steps of:
arranging a processor in communication with a display screen; and
providing machine readable instructions to the processor to display, on the display screen:
a first rotatable circular structure having a radius (R1) with a first centre point, the first structure comprising an in-use first visible circular scale displayed on the first structure, the visible display comprising a plurality of indicia for indicating corresponding musical notes such that the musical notes indicated in the visible display scale ascend in frequency in a clockwise or anti-clockwise direction;

a second circular structure having a radius (R3) that is less than the radius (R1) of the first structure, the second structure being arranged to be substantially concentric relative to the first substrate, the second substrate comprising a polygon with vertices of the polygon being located along the circumference of the second substrate, the second substrate comprising respective indicia corresponding to each of the vertices for indicating a musical mode from the following set of modes including Ionian, Dorian, Phyrigian, Lydian, Mixolydian, Aeolian and Locrian; and providing an input interface coupled with the first and second structures as displayed on the display screen to receive user input to effect rotation of the second structure and the first structure about the centre point.

18. A method in accordance with claim 17 wherein the step of providing machine readable instructions to the processor to display, on the display screen, the second substrate involves of structuring the vertices of the polygon such that when one of the vertices of the polygon of the second substrate is pointed towards a key musical note indicated on the visible display scale of the first substrate, the other of remaining vertices of the polygon on the second substrate identify a position of the other key musical notes constituting the respective musical mode corresponding to said one of the vertices of the polygon of the second substrate.

19. A method in accordance with claim 18 further comprises the step of providing machine readable instructions to the processor to display, on the display screen:

a third circular structure having a radius (R2) that is less than the radius (R1) of the first rotatable circular substrate and greater than the radius (R3) of the second structure, the third structure being arranged to be substantially concentric relative to the first and second structures, the third structure comprising an in-use visible circular scale displayed on the third substrate, the third visible display comprising indicia for indicating corresponding musical scale degrees or intervals or Solfège such that the musical scale degrees or intervals or Solfège indicated in the third visible scale ascend in frequency in a clock-wise or anti-clockwise direction.

20. A method in accordance with claim 18 further comprising the step of providing machine readable instructions to the processor to display, on the display screen:

a fourth structure being arranged to be substantially concentric and rotatable relative to the first and second structures, the fourth structure comprising a plurality of chord degree indicators provided on a circular scale such that the chord degrees indicated by each indicator ascend in a clockwise or anticlockwise direction; and providing an input interface coupled with the fourth structure as displayed on the display screen comprises to receive user input to effect rotation of the fourth structure about the centre point.

21. A method in accordance with claim 18 further comprising the step of providing machine readable instructions to the processor to display, on the display screen: a fifth structure comprising a one or more triangles wherein vertices of all of the one or more triangles lie on the same imaginary circle with the centre of the imaginary circle lying within an area bound by the one or more triangles, each triangle denoting a chord shape and wherein the fifth structure as displayed on the display screen comprises an input interface adapted to receive user input to effect rotation of the fifth structure about the centre point.

22. A method in accordance with claim 21 wherein the step of providing machine readable instructions to the processor to display, on the display screen: the fifth structure comprises displaying a plurality of the triangles wherein the plurality of triangles comprise an overlapping vertex located on the imaginary circle.

* * * * *